US012762858B2

(12) United States Patent
Singh et al.

(10) Patent No.: US 12,762,858 B2
(45) Date of Patent: Oct. 13, 2026

(54) METHODS AND SYSTEMS FOR LEARNING LANGUAGE-INVARIANT AUDIOVISUAL REPRESENTATIONS

(71) Applicant: Netflix, Inc., Los Gatos, CA (US)

(72) Inventors: Nikhil Singh, Los Gatos, CA (US); Iroro Orife, Los Gatos, CA (US); Chih-Wei Wu, Los Gatos, CA (US); Mahdi Kalayeh, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 210 days.

(21) Appl. No.: 18/505,081

(22) Filed: Nov. 8, 2023

(65) Prior Publication Data

US 2024/0161500 A1 May 16, 2024

Related U.S. Application Data

(60) Provisional application No. 63/424,377, filed on Nov. 10, 2022.

(51) Int. Cl.
*G06V 10/82* (2022.01)
*G06V 20/40* (2022.01)

(52) U.S. Cl.
CPC .............. *G06V 20/41* (2022.01); *G06V 10/82* (2022.01)

(58) Field of Classification Search
USPC .......................................................... 382/156
See application file for complete search history.

(56) References Cited

U.S. PATENT DOCUMENTS 11,983,923 B1 * 5/2024 Wang ...................... G06V 20/48
2020/0404386 A1 * 12/2020 Mccartney, Jr. ......... G06F 40/58
2021/0390270 A1 * 12/2021 Fei ......................... G06F 40/197
(Continued)

FOREIGN PATENT DOCUMENTS

WO WO-2022106654 A2 * 5/2022 ............. G10L 21/10

OTHER PUBLICATIONS

Arandjelovic, Relja, and Andrew Zisserman. "Look, listen and learn." Proceedings of the IEEE international conference on computer vision (Year: 2017).*
(Continued)

*Primary Examiner* — Chineyere Wills-Burns
*Assistant Examiner* — Bezawit Nolawi Shimeles
(74) *Attorney, Agent, or Firm* — Workman Nydegger

(57) ABSTRACT

The disclosed computer-implemented methods and systems include training a machine-learning model to accurately generate representations of similar scenes from long-form videos that have semantically different speech audio. For example, the methods and systems described herein generate machine-learning model training data including video clips and corresponding audio spectrograms. To augment this data, the methods and systems described herein further include dubbed audio spectrograms with the training data such that each video clips corresponds with a primary language audio spectrogram and a secondary language audio spectrogram. By applying a machine-learning model to this training data, the systems and methods described herein teach the machine-learning model to de-emphasize speech audio when generating audio visual representations corresponding to scenes from long-form video. Various other methods, systems, and computer-readable media are also disclosed.

20 Claims, 5 Drawing Sheets

(56) References Cited

U.S. PATENT DOCUMENTS

| | | | | |
|---|---|---|---|---|
| 2022/0245424 A1* | 8/2022 | Goyal | .................... | G06N 3/049 |
| 2022/0383048 A1* | 12/2022 | Fei | .......................... | G06F 40/44 |
| 2023/0394250 A1* | 12/2023 | Puri | ........................ | G06F 40/30 |
| 2025/0086408 A1* | 3/2025 | Thomson | ............... | G06V 40/28 |
| 2025/0324117 A1* | 10/2025 | Concolato | .......... | H04N 21/4884 |

OTHER PUBLICATIONS

Patrick, Mandela, et al. "Support-set bottlenecks for video-text representation learning." arXiv preprint arXiv:2010.02824 (Year: 2020).*

Morgado, Pedro, Yi Li, and Nuno Nvasconcelos. "Learning representations from audio-visual spatial alignment." Advances in Neural Information Processing Systems 33 (2020): 4733-4744 (Year: 2020).*

Zhao, Han, Junjie Hu, and Andrej Risteski. "On learning language-invariant representations for universal machine translation." International conference on machine learning. PMLR, 2020 (Year: 2020).*

Spiteri Miggiani, Giselle. "Measuring quality in translation for dubbing: a quality assessment model proposal for trainers and stakeholders." (2022) (Year: 2022).*

Nikhil Singh, et al., Looking Similar, Sounding Different: Leveraging Counterfactual Cross-Modal Pairs for Audiovisual Representation Learning, ResearchGate, Apr. 2023, pp. 1-17; https://www.researchgate.net/publication/369974478_Looking_Similar_Sounding_Different_Leveraging_Counterfactual_Cross-Modal Pairs_for_Audiovisual_Representation_Learning.

* cited by examiner

METHODS AND SYSTEMS FOR LEARNING LANGUAGE-INVARIANT AUDIOVISUAL REPRESENTATIONS

CROSS REFERENCE

This application claims the benefit of U.S. Provisional Application No. 63/424,377, filed Nov. 10, 2022, the disclosure of which is incorporated in its entirety, by this reference.

BACKGROUND

Videos are a rich source of information about the world, conveyed through visual and auditory channels. Although spoken language is influential in communicating high-level semantic information in videos, the sound landscapes of different scenes may contain much more. For instance, in some cases, the words spoken by actors may often vary arbitrarily even as other auditory and visual aspects of the scene remain tightly coupled.

For example, in one scenario, two entirely different conversations may be occurring in the same café or other setting. In audiovisual representation learning, these simultaneous conversations may distract from more important scene-level correlations between visual and auditory channels. These scene-level correlations may include object sounds, spatial correspondences, acoustics of environments, non-linguistic attributes of speech, or other types of correlations. Despite this, machine learning models that encode scenes into audiovisual representations often over-emphasize speech within the audio track of an encoded scene. For this reason, typical representation learning models often inaccurately generate representations of similar scenes that have audio tracks that include different speech patterns. Instead of generating representations that reflect how similar the scenes are, these encoding models generate representations that are overly focused on the differing speech patterns in the audio tracks of the scenes.

SUMMARY

As will be described in greater detail below, the present disclosure describes implementations that train machine-learning models to de-emphasize speech audio when generating audiovisual representations in a shared dimensional space.

In one example, a computer-implemented method for training a machine-learning model to accurately generate representations of similar scenes from long-form videos with different speech audio includes generating a training set including, from a long-form video, a video track clip, a primary language audio track corresponding to the video track clip, and a dubbed language audio track corresponding to the video track clip, applying the machine-learning model to the training set to generate a first video representation of the video track clip paired with the primary language audio track and a second video representation of the video track clip paired with the dubbed language audio track, and continually applying the machine-learning model to the training set until the first video representation and the second video representation are positioned within a threshold distance from each other within a representational space.

In some examples, the training set further includes, from the long-form video, additional video track clips, primary language audio tracks corresponding to the additional video track clips, and dubbed language audio tracks corresponding to the additional video track clips. Moreover, in some examples, the method further includes applying the machine-learning model to the training set to generate video representations of the additional video track clips paired with the primary language audio tracks corresponding to the additional video track clips, and video representations of the additional video track clips paired with the dubbed language audio tracks corresponding to the additional video track clips. Additionally, in some examples, the method includes continually applying the machine-learning model to the training set until the video representations of the additional video track clips paired with the primary language audio tracks corresponding to the additional video track clips and the video representations of the additional video track clips paired with the dubbed language audio tracks corresponding to the additional video track clips are positioned within the threshold distance from each other within the representational space.

In some examples, the dubbed language audio track corresponding to the video track is in one of Spanish, French, or Japanese. Additionally, in some examples, the machine-learning model includes convolutional neural network encoders and transformer models that are specialized for processing videos and audio spectrograms. Moreover, in some examples, the first video representation and the second video representation include 1024-dimensional vectors output by the convolutional neural network encoders. Furthermore, in some examples, the machine-learning model further includes multi-layer perceptron heads that project the first video representation and the second video representation into the representational space. Additionally, in some examples, the representational space includes a 512-dimensional space. In most examples, the method further includes applying the machine-learning model to a new long-form video for one or more of audiovisual scene classification, emotion recognition, action recognition, or speech keyword recognition.

Some examples described herein include a system with at least one physical processor and physical memory including computer-executable instructions that, when executed by the at least one physical processor, cause the at least one physical process to perform acts. In at least one example, the computer-executable instructions, when executed by the at least one physical processor, cause the at least one physical process to perform acts including generating a training set including, from a long-form video, a video track clip, a primary language audio track corresponding to the video track clip, and a dubbed language audio track corresponding to the video track clip, applying the machine-learning model to the training set to generate a first video representation of the video track clip paired with the primary language audio track and a second video representation of the video track clip paired with the dubbed language audio track, and continually applying the machine-learning model to the training set until the first video representation and the second video representation are positioned within a threshold distance from each other within a representational space.

In some examples, the above-described method is encoded as computer-readable instructions on a computer-readable medium. In one example, the computer-readable instructions, when executed by at least one processor of a computing device, cause the computing device to generate a training set including, from a long-form video, a video track clip, a primary language audio track corresponding to the video track clip, a first dubbed language audio track corresponding to the video track clip, and a second dubbed language audio track corresponding to the video track clip, apply a machine-learning model to the training set to generate a first video representation of the video track clip paired with the primary language audio track, a second video representation of the video track clip paired with the first dubbed language audio track, and a third video representation of the video track clip paired with the second dubbed language audio track, and continually apply the machine-learning model to the training set until the first video representation, the second video representation, and the third video representation are positioned within a threshold distance from each other within a representational space.

In one or more examples, features from any of the embodiments described herein are used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
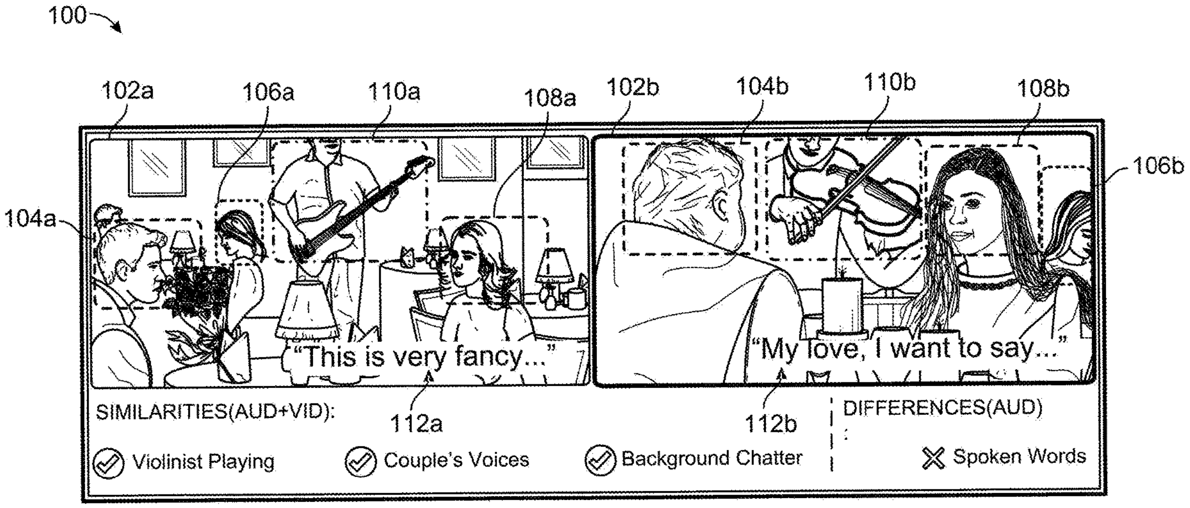
FIG. 1 is an overview illustration of the "looking similar while sounding different" problem addressed by a language-invariant audiovisual system disclosed herein.

Throughout the drawings, identical reference characters and descriptions indicate similar, but not necessarily identical, elements. While the exemplary embodiments described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As mentioned above, typical encoding models over-emphasize speech sounds when generating scene representations. For example, in long-form videos such as movies, multiple scenes may take place in the same setting—often with the same actors and types of ambient noise. To illustrate, a movie may include multiple scenes that take place in the same café where the same actors have different conversations. As such, the scenes include similar visuals (e.g., the café and the actors) and similar ambience sounds (e.g., glasses clinking, background conversation, café music), but different speech audio (e.g., due to different conversations that take place). Typical machine-learning models that generate representational encodings of audiovisual scenes, however, often over-emphasize speech. As such, a typical encoding model will often generate very different representations of scenes that are very similar—save for the speech audio.

By generating these inaccurate representations, typical encoding models introduce additional inaccuracies in other machine learning tasks. To illustrate, machine-learning models can be used in combination with long-form videos to perform tasks such as time-based semantic and cautionary tagging, explainable recommendations, creation of personalized promotional assets, and so forth. Teaching these machine-learning models to perform these tasks often relies on encoded audiovisual representations; i.e., compressed numerical descriptions of audiovisual clips. In self-supervised learning, the structure of the data within these representations is crucial in avoiding the need for human-generated content annotations. For example, in self-supervised learning, a model can effectively learn to recognize objects by predicting if a slightly processed image belongs to the same category as the unprocessed original.

In connection with video content, models are often taught to learn representations by having the models predict correspondences between video modalities—such as the correspondence between a visual clip of a scene and an audio clip of the same scene. For example, a model is trained to recognize which auditory and visual clips match as part of the same original scene. This encourages the model to encode the clips into useful representations that capture multimodal characteristics, thereby allowing discrimination between different clips—while keeping similar clips closer together in a representational space. Despite this, when such a model over-emphasizes speech audio as mentioned above, the inaccurate representations it generates of similar scenes with different speech audio will not be close together in that representational space. These inaccuracies then bleed into other machine-learning based video and/or audio processing tasks.

Training such models to de-emphasize speech audio, however, is challenging. For example, as mentioned above, the "looking similar while sounding different" problem most often arises in connection with long-form videos where the same backdrops and actors are seen many times over the course of a movie or episode. Despite this, many models are trained with random short-form videos such as those found for free on the Internet. As such, this short-form video training data generally fails to reflect multiple scenes that look similar but with different speech audio.

To solve these problems, the present disclosure describes a system that leverages long-form video along with audio dubs to train a machine-learning model to accurately generate accurate audiovisual representations of scenes that are visually similar but have different speech audio. For example, as discussed in greater detail below, the described system generates training data including visual clips from long-form videos along with audio tracks corresponding to the visual clips that include multiple variations on the speech from those visual clips. To illustrate, the described system generates training data including a visual clip from a long-form video, an audio clip corresponding to the visual clip that includes speech in English, and at least one additional audio clip corresponding to the visual clip that includes speech with the same semantic meaning but in a different language (e.g., Spanish, French, and/or Japanese). The described system then applies an embedding model to this training data to generate an embedding of the visual clip and the English speech audio and an embedding of the visual clip and the additional speech audio. Over multiple training epochs, the described system helps the embedding model learn to generate these embeddings such that they are positioned within a threshold distance in a representative space—indicating that the embedding model has learned that the scenes are similar, even though the speech audio does not include the same semantic meaning.

Features from any of the implementations described herein may be used in combination with one another in accordance with the general principles described herein. These and any other implementations, features, and advantages will be more fully understood upon reading the following detailed description in conjunction with the accompanying drawings and claims.

Figure 2:
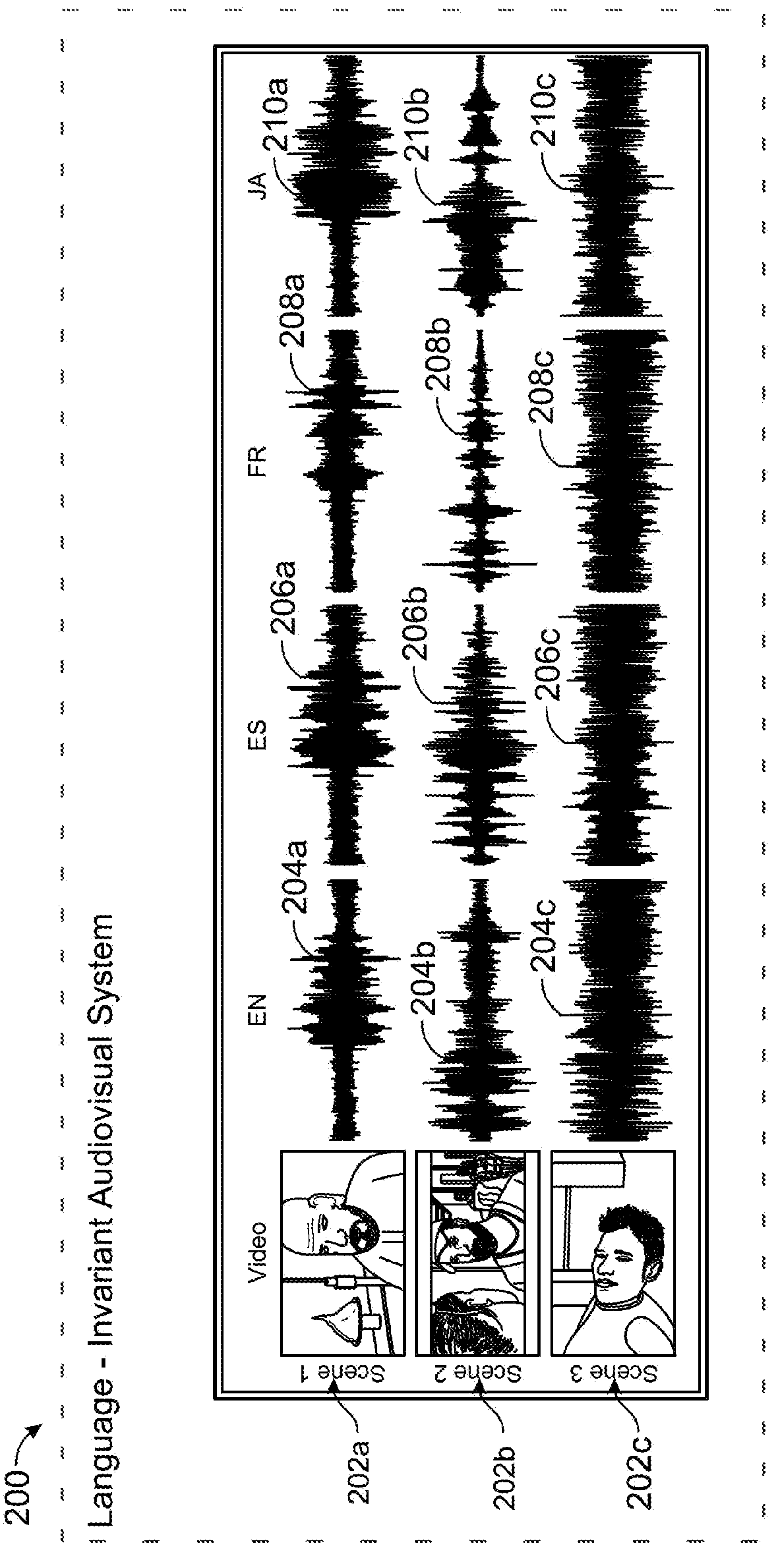
FIG. 2 illustrates video tracks with corresponding audio tracks in a primary language and additional secondary languages in accordance with one or more implementations.
Figure 3:
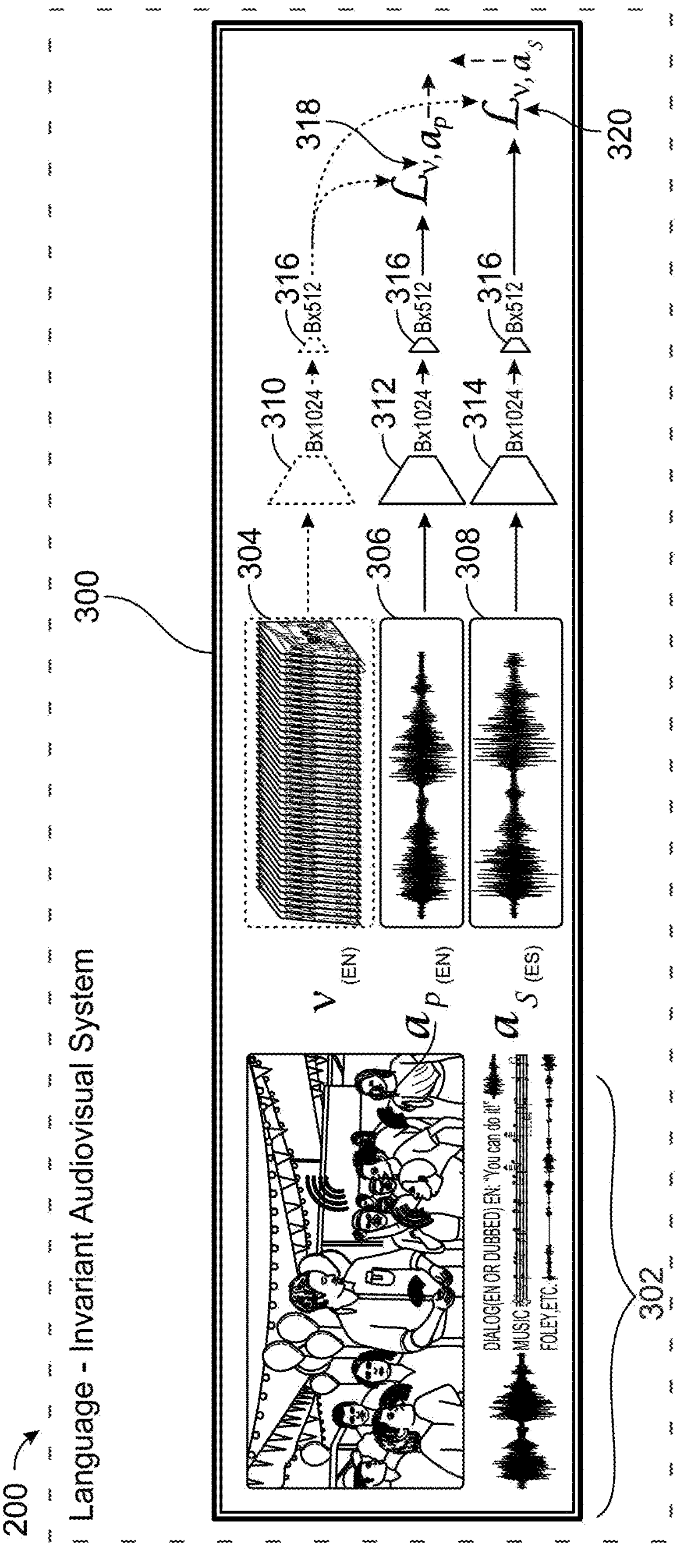
FIG. 3 illustrates how the language-invariant audiovisual system applies a machine learning model to the training set including dubbed language audio tracks in accordance with one or more implementations.
Figure 4:
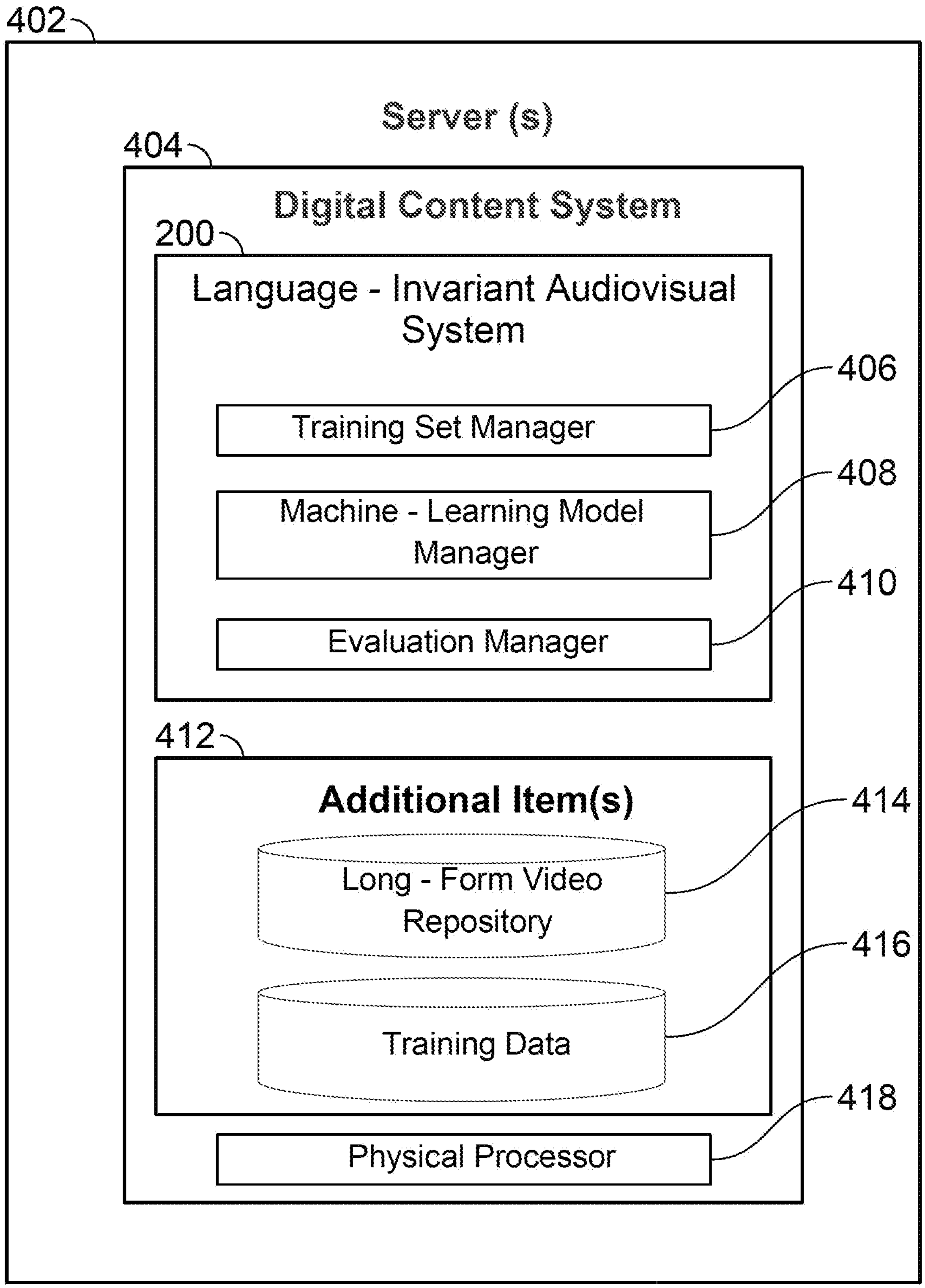
FIG. 4 is a detailed diagram of the language-invariant audiovisual system in accordance with one or more implementations.
Figure 5:
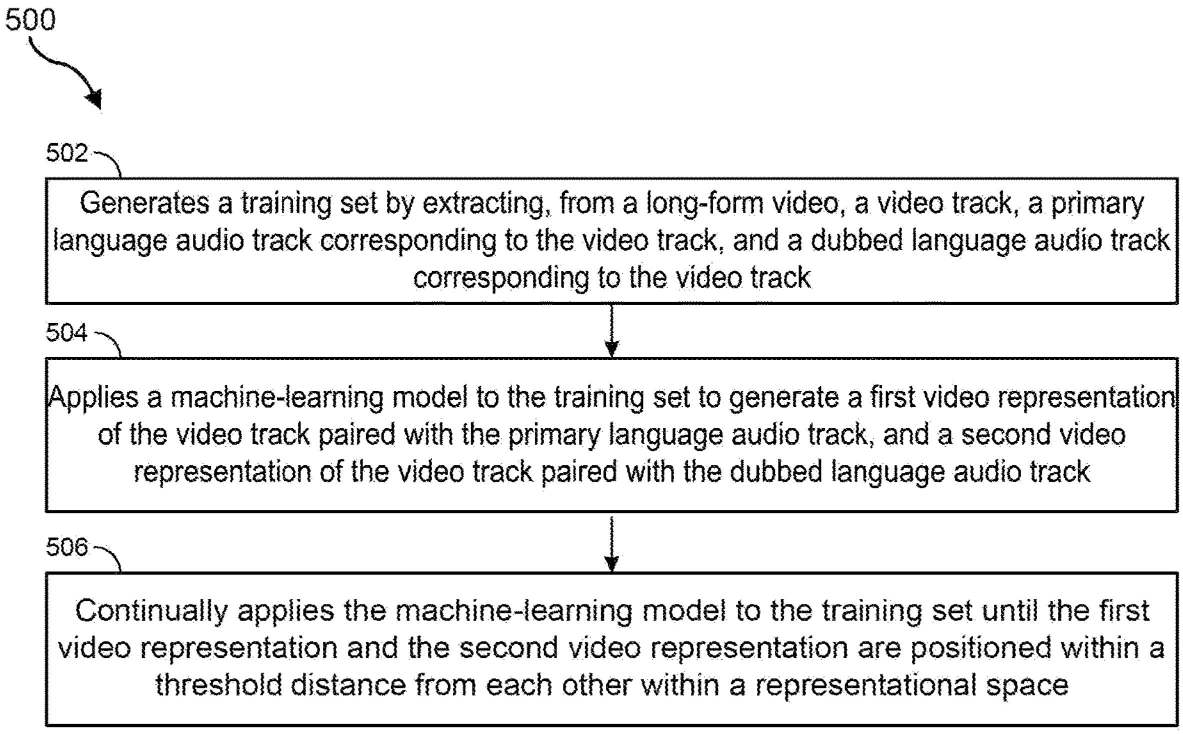
FIG. 5 is a flow diagram illustrating steps taken by the language-invariant audiovisual system in training a machine-learning model to de-emphasize speech audio while generating video representations of scenes from long-form videos in accordance with one or more implementations.

The following will provide, with reference to FIGS. 1-5, detailed descriptions of a language-invariant audiovisual system. For example, FIG. 1 gives an overview of the "looking similar while sounding different" problem along with a description of how this problem affects self-supervised machine-learning tasks in connection with long-form videos. FIG. 2 illustrates how dubbed language audio tracks are utilized by the language-invariant audiovisual system in training machine-learning models to solve the "looking similar while sounding different" problem. FIG. 3 illustrates how the language-invariant audiovisual system utilizes dubbed audio-based training data to train a machine-learning model, while FIG. 4 illustrates additional detail associated with the language-invariant audiovisual system. FIG. 5 illustrates a series of steps taken by the language-invariant audiovisual system while training a machine-learning model to de-emphasize speech audio when generating video representations or vectors.

As just mentioned, FIG. 1 illustrates additional detail with regard to the "looking similar while sounding different" problem. For example, as shown in FIG. 1, a first scene 102*a* and a second scene 102*b* are from the one or more long-form videos (e.g., movies). Both the first scene 102*a* and the second scene 102*b* depict a first actor 104*a*, 104*b*, a second actor 106*a*, 106*b*, and a third actor 108*a*, 108*b*. Additionally, the first scene 102*a* and the second scene 102*b* include live music being played by musicians 110*a* and 110*b*. Despite these multimodal similarities, the scene 102*a* includes speech 112*a* (e.g., "This is very fancy . . . ") while the scene 102*b* includes speech 112*b* (e.g., "My love, I want to say . . . ").

Because of the semantic differences between the speech 112*a* and the speech 112*b*, typical embedding models generate representations of the first scene 102*a* and the second scene 102*b* that are positioned very differently within a representational space. As such, and as mentioned above, a language-invariant audiovisual system is described herein that teaches an embedding model to de-emphasize speech audio when generating scene embeddings. With speech audio de-emphasized, the trained embedding model generates rich embeddings of similar scenes with semantically different speech that are positioned close to each other within a representative space—indicating that the embedding model has learned that the scenes are similar even when the speech audio is semantically different. Thus trained, the embedding model can be applied to other machine learning tasks in connection with long-form videos.

To train a machine-learning model to de-emphasize speech audio while generating long-form video scene embeddings, a language-invariant audiovisual system relies on dubbed audio. To illustrate, as shown in FIG. 2, the language-invariant audiovisual system 200 generates machine-learning model training data including video track clips 202*a*, 202*b*, and 202*c* from one or more long-form videos. In one or more implementations, the language-invariant audiovisual system 200 further generates the training data by extracting primary language audio tracks 204*a*, 204*b*, and 204*c* corresponding to the video track clips 202*a*-202*c*, respectively. In at least one implementation, the primary language audio tracks 204*a*-204*c* are in English (EN).

In one or more examples, the language-invariant audiovisual system 200 further generates the training data including dubbed audio tracks. For example, as further shown in FIG. 2, the language-invariant audiovisual system 200 further extracts dubbed language audio tracks 206*a*, 206*b*, and 206*c* corresponding to the video track clips 202*a*-202*c*, respectively. In at least one implementation, the dubbed language audio tracks 206*a*-206*c* are in Spanish (ES). Moreover, in some examples, the language-invariant audiovisual system 200 further extracts additional dubbed language audio tracks 208*a*, 208*b*, 208*c*, 210*a*, 210*b*, and 210*c* corresponding to the video track clips 202*a*-202*c*, respectively. In one or more implementations, the additional dubbed language audio tracks 208*a*-208*c*, are in French (FR), while the additional dubbed language audio tracks 210*a*-210*c*, are in Japanese (JA).

In one or more implementations, as mentioned above, the language-invariant audiovisual system 200 utilizes the training data including dubbed language audio tracks to train a machine-learning model to generate video representations (e.g., embeddings or encodings) that de-emphasize speech audio. For example, as shown in greater detail in FIG. 3, the language-invariant audiovisual system 200 applies a machine-learning model 300 to training data corresponding to a long-form video 302. As shown, the long-form video 302 includes a video track and corresponding audio. In most examples, the audio includes dialog or speech, music, and other scene sounds (e.g., foley, sound effects).

As discussed above, the training data corresponding to the long-form video 302 also includes at least one dubbed language audio track—such as a dubbed language audio track in Spanish (ES). In most examples, this dubbed language audio track is similar to the primary language audio track except that the dialog or speech is replaced with its translation into another language. For example, the translation into the additional language is often not a direct translation, but rather includes the same semantic meaning as the original speech. Thus, the dubbed language audio track includes the same music, background noise, sound effects, etc. as the primary language audio track. The only difference is that any spoken language in English is replaced by spoken language in a secondary language such as Spanish.

Accordingly, during training, the language-invariant audiovisual system 200 applies the machine-learning model 300 to the training data such that the machine-learning model 300 passes a video track clip 304 from the long-form video 302 through a video encoder 310. The machine-learning model 300 further passes the primary language audio track 306 and the dubbed language audio track 308 through audio encoders 312, 314. In some implementations, the audio encoders 312, 314 are a single audio encoder rather than separate audio encoders. In one or more implementations, each of the video encoder 310, the audio encoder 312, and the audio encoder 314 output 1024-dimensional features, vectors, or representations. In most examples, the encoders 310, 312, and 314 are convolutional neural network encoders, specialized for processing videos and audio spectrograms, respectively. In some examples, the encoders 310, 312, and 314 accept 3-second video and audio clips, respectively. In additional implementations, the machine-learning model 300 further includes one or more transformation models.

In most examples, the machine-learning model 300 further passes these 1024-dimensional representations into a projection head model 316. In one or more implementations, the projection head model 316 is a multi-layer perceptron (MLP) head model. As such, the machine-learning model 300 passes the 1024-dimensional representations through the projection head model 316 to project the 1024-dimensional representations into a shared 512-dimensional space.

With the 1024-dimensional representations projected into this shared representational space, the machine-learning model 300 computes the contrastive objective function for the first cross-modal pair 318 (e.g., including the video track clip 304 paired with the primary language audio track 306) and the second cross-modal pair 320 (e.g., including the video track clip 304 paired with the dubbed language audio track 308). In one or more implementations, the machine-learning model 300 utilizes normalized temperature-scaled cross-entropy as the contrastive objective function. For example, for a positive pair ($z_i$, $z_j$), the machine-learning model 300 determines:

$$l_{i,j} = -\log\frac{\exp\left(\frac{S_c(z_i, z_j)}{\tau}\right)}{\sum_{k=1}^{N} 1[k \neq i]\exp\left(\frac{S_c(z_i, z_j)}{\tau}\right)}$$

Where k is the number of clips that are sampled from the same film (e.g., where k is a hyperparameter, and $$S_c(u, v) = \frac{u^T v}{\|u\|\|v\|}$$

is the cosine similarity, and $1[k \neq i]$ is an indicator function. The machine-learning model 300 sums across the cross-modal pairs (v=video track clip 304, $\alpha_p$=primary language audio track 306, and $\alpha_s$=dubbed language audio track 308):

$$L(v, a_p, a_s) = \sum_{a \in \{a_p, a_s\}} \frac{l_{v,a} + l_{a,v}}{2}$$

FIG. 4 illustrates additional detail with regard to the features and functionality of the language-invariant audiovisual system 200 in connection with generating training data and training a machine-learning model to generate language-invariant video representations. As such, FIG. 4 illustrates a block diagram 400 of the language-invariant audiovisual system 200 operating as part of a digital content system 404 within a memory of a server(s) 402 while performing these functions. For example, as shown in FIG. 4, the language-invariant audiovisual system 200 includes a training set manager 406, a machine-learning model manager 408, and an evaluation manager 410. As further shown in FIG. 4, the server(s) 402 further includes additional item(s) 412 including a long-form video repository 414 and training data 416. The server(s) 402 also includes a physical processor 418.

In certain implementations, the language-invariant audiovisual system 200 represents one or more software applications, modules, or programs that, when executed by a computing device, may cause the computing device to perform one or more tasks. For examples, and as will be described in greater detail below, one or more of the training set manager 406, the machine-learning model manager 408, or the evaluation manager 410 represent software stored and configured to run on one or more computing devices such as the server(s) 402. One or more of the training set manager 406, the machine-learning model manager 408, and the evaluation manager 410 of the language-invariant audiovisual system 200 shown in FIG. 4 may also represent all or portions of one or more special purpose computers to perform one or more tasks.

As mentioned above, and as shown in FIG. 4, the language-invariant audiovisual system 200 includes the training set manager 406. In one or more implementations, the training set manager 406 generates one or more training sets that incorporate long-form video data as well as dubbed language audio. For example, in most examples, the training set manager 406 generates a training set from the long-form video repository 414, where each long-form video in the long-form video repository 414 contains a video track, as well as up to four audio tracks. In most examples, each long-form video is associated with a primary language audio track in English, as well as second language audio tracks in Spanish, French, and Japanese. As mentioned above, each of the second language audio tracks include the same music, background noise, foley, etc. as the corresponding primary language audio track. The only difference is in the spoken language.

In one or more implementations, the training set manager 406 further generates the training set by dividing each long-form video in the long-form video repository 414 into 3-second non-overlapping clips. In some examples, the training set manager 406 maintains movie-level identifiers for each clip—for later use in a negative sampling strategy—while noting the hierarchical nature of the dataset. Alternatively, in some implementations, the training set manager 406 divides the long-form videos based on camera shot boundaries.

In at least one implementation, the training set manager 406 takes various modality-specific considerations. To illustrate, in most examples, the training set manager 406 applies, to video clips, a pipeline consisting of 1) uniformly subsampling 16 frames from a 3-second video clip (e.g., regardless of frame rate), 2) randomly rescaling the height of the subsampled frames to between 256 and 320 pixels while maintaining the aspect ratio, 3) randomly cropping to 224×224 pixels, and 4) applying a random augmentation model with 1 layer, and a distortion magnitude set to 9.

In one or more examples, the training set manager 406 utilizes audio tracks that are initially in 5.1 surround format (i.e., left channel, right channel, center channel, low frequency effect channel, left-surround channel, right-surround channel) with a sample rate of 48 kHz and a bit-depth of 16 bit. As such, in most examples, the training set manager 406 performs a standard AC-3 down-mix to stereo to preserve typical channel relationships before further pre-processing. In some examples, due to the scale of this multichannel audio, the training set manager 406 stores clips with compression in a high-quality codec at 256 kbps. The training set manager 406 further extracts audio spectrograms from the stereo audio tracks, parameterized with a 1024-dimensional Hanning window and a hop size of 512 with 96 mel bins. This results in an input representation of dimension C×96×280 where C=2 (for stereo) for each audio track. The training set manager 406 then applies both time and frequency masking as augmentation, each with a rate of 0.5.

As a result of all this pre-processing, the training set manager 406 generates a training set of 3-second video clips, corresponding primary language audio tracks, and corresponding dubbed language audio tracks. As discussed above, the training set manager 406 extracts these elements from long-form videos (e.g., such as those in the long-form video repository 414) to ensure that the training set includes scenes that look similar; namely including the same settings, the same actors, the same landmarks, the same buildings, the same backgrounds, etc.

As mentioned above, and as shown in FIG. 4, the language-invariant audiovisual system 200 includes the machine-learning model manager 408. In one or more implementations, the machine-learning model manager 408 generates and trains a machine-learning model to generate language-invariant video representations. For example, the machine-learning model manager 408 generates a machine-learning model including both video and audio convolutional neural network encoders that are specialized for processing videos and audio spectrograms, respectively. As discussed above, the video and audio encoders output clip-level representations in the form of 1024-dimensional vectors. The machine-learning model manager 408 further generates the machine-learning model with multi-layer perceptron (MLP) heads to further reduce the dimensionality of the representations during training. This allows the machine-learning model to compute the contrastive loss in this lower-dimensional representation space.

Moreover, in most examples, the machine-learning model manager 408 trains the machine-learning model utilizing the training set generated by the training set manager 406. For example, the machine-learning model manager 408 trains the machine-learning model cross-modally; computing the contrastive cost between modalities. This results in two optimized costs, summed together. These are between a video track and the corresponding primary language audio track (e.g., $l(V, A_p)$ from the equation above), and the video track and the corresponding dubbed language audio track (e.g., $l(V, A_s)$ from the equation above).

In one or more implementations, the machine-learning model manager 408 continually applies the machine-learning model to the training set until the machine-learning model is fully trained. In some examples, the machine-learning model manager 408 trains the machine-learning model on four A100 GPUs for ten epochs with a batch size of 26 per GPU (total=104). In at least one example, the machine-learning model manager 408 uses the negative sampling parameter k (samples per long-form video), which is set to 12 per GPU (total=48). The machine-learning model manager 408 further uses an optimizer with $\beta$=(0.9, 0.999), a learning rate of 0.001, and weight decay set to 0.05. In some examples, the machine-learning model manager 408 uses a cosine learning rate schedule with a half-epoch warmup.

In one or more implementations, the machine-learning model manager 408 trains the machine-learning model following any of multiple variants. For example, in at least one implementation, the machine-learning model manager 408 performs baseline training according to a "pseudo-dub" variant. In the "pseudo-dub" variant, the machine-learning model manager 408 trains machine-learning models with two differently augmented primary (English) audio treated as "primary" and "secondary" audio, respectively. In most examples, this accounts for any possible effect of two augmentations per seen sample, as occurs for the with-dub cases.

In additional implementations, the machine-learning model manager 408 trains the machine-learning model according to a "bilingual" variant. In the "bilingual" variant, the machine-learning model manager 408 trains the machine-learning model across all of the secondary languages alternately during the individual steps of the same training. For example, the machine-learning model manager 408 alternately trains one or more machine-learning models for English/Spanish, English/French, and English/Japanese. Over the course of training, the machine-learning model manager 408 continually applies the machine-learning model to the training set until the machine-learning model outputs video representations for each of the language pairs that are positioned close to each other within a representational space. In most examples, the machine-learning model manager 408 trains the machine-learning model cross-modally. As such, the machine-learning model manager 408 continually applies the machine-learning model to the training set until each video representation is positioned close to both the primary and secondary audio representations within the representational space. Thus, for example, the machine-learning model manager 408 continually applies the machine-learning model to the training set until the machine-learning model outputs video representations that are positioned within the 512-dimension representational space and within a threshold distance from each other.

In additional implementations, the machine-learning model manager 408 trains the machine-learning model according to a "multilingual" variant. In the "multilingual" variant, the machine-learning model manager 408 randomly selects a dubbed or secondary language from the given list (Spanish, French, Japanese) per batch. The machine-learning model manager 408 randomizes the order of samples, and then circles through the list round-robin.

In additional implementations, the machine-learning model manager 408 trains the machine-learning model according to a "no-speech" variant. In the "no-speech" variant, the machine-learning model manager 408 trains the machine-learning model on English audio with the speech removed. For example, the training set manager 406 generates a training set with vocal sounds separated out of the primary language audio tracks corresponding to the training video tracks.

In additional implementations, the machine-learning model manager 408 trains the machine-learning model according to an "audio-only" variant. In the "audio-only" variant, the machine-learning model manager 408 trains two audio-only (e.g., no video) models. The machine-learning model manager 408 utilizes training data similar to that used in connection with the "pseudo-dub" and "multilingual" variants, except without any video tracks. As such, the machine-learning model manager 408 applies the objective function within-modal (i.e., between the two audio clips). The "audio-only" variant represents standard audio-based contrastive training with two augmented copies.

In one or more implementations, the machine-learning model manager 408 trains one or more machine-learning models according to any of the variants discussed above. In some implementations, the machine-learning model manager 408 compares the outputs of machine-learning models trained according to any of these variants to determine optimal training strategies.

As mentioned above, and as shown in FIG. 4, the language-invariant audiovisual system 200 includes the evaluation manager 410. In one or more implementations, the evaluation manager 410 examines the relative performance of the dub-based multilingual pretraining approach discussed above on a wide variety of tasks. For example, the evaluation manager 410 evaluates the one or more machine-learning models on sound and scene classification tasks (non-linguistic), on non-semantic speech tasks (paralinguistic) such as emotion recognition and speaker count estimation tasks, on semantic speech tasks such as keyword and command recognition tasks, on language tasks such as specific word recognition, and on visual and audiovisual tasks such as action recognition tasks. Through these tasks, the evaluation manager 410 seeks to compare the outputs of the language-invariant trained (e.g., trained with dubbed audio) machine-learning model against industry-standard benchmarks.

Moreover, as shown in FIG. 4, the server(s) 402 includes the additional item(s) 412. On the server(s) 402, the additional item(s) 412 include the long-form video repository 414 and the training data 416. In one or more implementations, the long-form video repository 414 includes digital audiovisual content that is one or more hours long. Moreover, as discussed above, the long-form video repository 414 further includes dubbed audio tracks corresponding to the digital audiovisual content. In one or more implementations, the training data 416 includes one or more training sets extracted from the long-form video repository 414.

As shown in FIG. 4, the server(s) 402 includes one or more physical processors, such as the physical processor 418. The physical processor 418 generally represents any type or form of hardware-implemented processing unit capable of interpreting and/or executing computer-readable instructions. In one implementation, the physical processor 418 accesses and/or modifies one or more of the components of the language-invariant audiovisual system 200. Examples of physical processors include, without limitation, microprocessors, microcontrollers, Graphics Processing Units (GPUs), Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, in most examples, the server(s) 402 includes a memory. In one or more implementations, the memory generally represents any type or form of volatile or non-volatile storage device or medium capable of storing data and/or computer-readable instructions. In one example, the memory stores, loads, and/or maintains one or more of the components of the language-invariant audiovisual system 200. Examples of the memory can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As mentioned above, FIG. 5 is a flow diagram of an exemplary computer-implemented method 500 for training a machine-learning model to learn language-invariant video representations. The steps shown in FIG. 5 may be performed by any suitable computer-executable code and/or computing system, including the system(s) illustrated in FIG. 3. In one example, each of the steps shown in FIG. 5 may represent an algorithm whose structure includes and/or is represented by multiple sub-steps, examples of which will be provided in greater detail below.

As illustrated in FIG. 5, at step 502 the language-invariant audiovisual system 200 generates a training set by extracting, from a long-form video, a video track, a primary language audio track corresponding to the video track, and a dubbed language audio track corresponding to the video track. In most examples, the language-invariant audiovisual system 200 further generates the training set with additional video tracks, primary language audio tracks corresponding to the additional video tracks, and dubbed language audio tracks corresponding to the additional video tracks—all extracted from long-form video. In most examples, the dubbed language audio tracks are in at least one of Spanish, French, or Japanese.

Additionally, as illustrated in FIG. 5, at step 504 the language-invariant audiovisual system 200 applies a machine-learning model to the training set to generate a first video representation of the video track paired with the primary language audio track, and a second video representation of the video track paired with the dubbed language audio track. In most examples, the language-invariant audiovisual system 200 further applies the machine-learning model to the training set to generate video representations of the additional video tracks paired with the primary language audio tracks corresponding to the additional video tracks, and video representations of the additional video tracks paired with the dubbed language audio tracks corresponding to the additional video tracks.

Furthermore, as illustrated in FIG. 5, at step 506 the language-invariant audiovisual system 200 continually applies the machine-learning model to the training set until the first video representation and the second video representation are positioned within a threshold distance from each other within a representational space. In most examples, the language-invariant audiovisual system 200 also continually applies the machine-learning model to the training set until the video representations of the additional video tracks paired with the primary language audio tracks corresponding to the additional video tracks and the video representations of the additional video tracks paired with the dubbed language audio tracks corresponding to the additional video tracks are positioned within the threshold distance from each other within the representational space.

In summary, the language-invariant audiovisual system 200 effectively augments contrastive training of a machine-learning model using dubbed language audio tracks to help the machine-learning model learn to de-emphasize speech audio when generating representations of audiovisual clips. As discussed above, the language-invariant audiovisual system 200 generates and utilizes training data taken from long-form video to teach the machine-learning model to recognize that representations of similar looking scenes with semantically dissimilar speech audio should still be positioned near each other in a representational space. Utilizing this dubbed audio strategy, the language-invariant audiovisual system 200 encourages the machine-learning model to discover deeper audiovisual alignments beyond spoken words. As such, the trained machine-learning model is suitable for use in a diverse range of audio, visual, and multimodal recognition tasks—particularly in connection with long-form video such as movies and longer TV episodes.

Example Implementations

Example 1: A computer-implemented method for training a machine-learning model to accurately generate representations of similar scenes from long-form videos that have semantically dissimilar speech audio. For example, the method may include generating a training set including, from a long-form video, a video track clip, a primary language audio track corresponding to the video track clip, and a dubbed language audio track corresponding to the video track clip, applying the machine-learning model to the training set to generate a first video representation of the video track clip paired with the primary language audio track and a second video representation of the video track clip paired with the dubbed language audio track, and continually applying the machine-learning model to the training set until the first video representation and the second video representation are positioned within a threshold distance from each other within a representational space.

Example 2: The computer-implemented method of Example 1, wherein the training set further includes, from the long-form video, additional video track clips, primary language audio tracks corresponding to the additional video track clips, and dubbed language audio tracks corresponding to the additional video track clips.

Example 3: The computer-implemented method of any of Examples 1 and 2, further including applying the machine-learning model to the training set to generate video representations of the additional video track clips paired with the primary language audio tracks corresponding to the additional video track clips, and video representations of the additional video track clips paired with the dubbed language audio tracks corresponding to the additional video track clips.

Example 4: The computer-implemented method of any of Examples 1-3, further including continually applying the machine-learning model to the training set until the video representations of the additional video track clips paired with the primary language audio tracks corresponding to the additional video track clips and the video representations of the additional video track clips paired with the dubbed language audio tracks corresponding to the additional video track clips are positioned within the threshold distance from each other within the representational space.

Example 5: The computer-implemented method of any of Examples 1-4, wherein the dubbed language audio track corresponding to the video track clip is in one of Spanish, French, or Japanese.

Example 6: The computer-implemented method of any of Examples 1-5, wherein the machine-learning model includes convolutional neural network encoders and transformer models that are specialized for processing videos and audio spectrograms.

Example 7: The computer-implemented method of any of Examples 1-6, wherein the first video representation and the second video representation include 1024-dimensional vectors output by the convolutional neural network encoders.

Example 8: The computer-implemented method of any of Examples 1-7, wherein the machine-learning model further includes multi-layer perceptron heads that project the first video representation and the second video representation into the representational space.

Example 9: The computer-implemented method of any of Examples 1-8, wherein the representational space includes a 512-dimensional space.

Example 10: The computer-implemented method of any of Examples 1-9, further including applying the machine-learning model to a new long-form video for one or more of audiovisual scene classification, emotion recognition, action recognition, or speech keyword recognition.

In some examples, a system may include at least one processor and a physical memory including computer-executable instructions that, when executed by the at least one processor, cause the at least one processor to perform various acts. For example, the computer-executable instructions may cause the at least one processor to perform acts including generating a training set including, from a long-form video, a video track clip, a primary language audio track corresponding to the video track clip, and a dubbed language audio track corresponding to the video track clip, applying the machine-learning model to the training set to generate a first video representation of the video track clip paired with the primary language audio track and a second video representation of the video track clip paired with the dubbed language audio track, and continually applying the machine-learning model to the training set until the first video representation and the second video representation are positioned within a threshold distance from each other within a representational space.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to generate a training set including, from a long-form video, a video track clip, a primary language audio track corresponding to the video track clip, a first dubbed language audio track corresponding to the video track clip, and a second dubbed language audio track corresponding to the video track clip, apply a machine-learning model to the training set to generate a first video representation of the video track clip paired with the primary language audio track, a second video representation of the video track clip paired with the first dubbed language audio track, and a third video representation of the video track clip paired with the second dubbed language audio track, and continually apply the machine-learning model to the training set until the first video representation, the second video representation, and the third video representation are positioned within a threshold distance from each other within a representational space.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method for training a machine-learning model to generate language-invariant video representations, the computer-implemented method comprising:

generating a training set comprising, from a long-form video, a video track clip, a primary language audio track corresponding to the video track clip, and a dubbed language audio track corresponding to the video track clip, wherein the dubbed language audio track preserves non-speech audio corresponding to the video track clip and replaces spoken language with translated spoken language;

applying, by one or more physical processors, the machine-learning model to the training set to generate:

a video representation of the video track clip, a primary-language audio representation of the primary language audio track, and a dubbed-language audio representation of the dubbed language audio track;

projecting, by one or more projection heads of the machine-learning model, the video representation, the primary-language audio representation, and the dubbed-language audio representation into a shared representational space;

computing, by the one or more physical processors, a contrastive cost between modalities, the contrastive cost comprising a first cost between the projected video representation and the projected primary-language audio representation, and a second cost between the projected video representation and the projected dubbed-language audio representation, wherein the contrastive cost comprises a sum of the first cost and the second cost; and iteratively updating parameters of the machine-learning model based on the contrastive cost over multiple training epochs to train the machine-learning model to position the projected video representation within a threshold distance of each of the projected primary-language audio representation and the projected dubbed-language audio representation within the shared representational space.

2. The computer-implemented method of claim 1, wherein the training set further comprises, from the long-form video, additional video track clips, primary language audio tracks corresponding to the additional video track clips, and dubbed language audio tracks corresponding to the additional video track clips.

3. The computer-implemented method of claim 2, further comprising applying the machine-learning model to the training set to generate:

video representations of the additional video track clips paired with the primary language audio tracks corresponding to the additional video track clips, and video representations of the additional video track clips paired with the dubbed language audio tracks corresponding to the additional video track clips.

4. The computer-implemented method of claim 3, wherein applying the machine-learning model to the training set further comprises generating, for each of the additional video track clips, an additional video representation of the additional video track clip, an additional primary-language audio representation of the primary language audio track corresponding to the additional video track clip, and an additional dubbed-language audio representation of the dubbed language audio track corresponding to the additional video track clip, and projecting the additional video representation, the additional primary-language audio representation, and the additional dubbed-language audio representation into the shared representational space.

5. The computer-implemented method of claim 1, wherein the dubbed language audio track corresponding to the video track clip is in one of Spanish, French, or Japanese.

6. The computer-implemented method of claim 1, wherein the machine-learning model comprises convolutional neural network encoders and transformer models that are specialized for processing videos and audio spectrograms.

7. The computer-implemented method of claim 6, wherein the first video representation and the primary-language audio representation comprise 1024-dimensional vectors output by the convolutional neural network encoders.

8. The computer-implemented method of claim 7, wherein the machine-learning model further comprises multi-layer perceptron heads that project the video representation, the primary-language audio representation, and the dubbed-language audio representation into the shared representational space.

9. The computer-implemented method of claim 8, wherein the shared representational space comprises a 512-dimensional space.

10. The computer-implemented method of claim 1, further comprising applying the machine-learning model to a new long-form video for one or more of audiovisual scene classification, emotion recognition, action recognition, or speech keyword recognition.

11. A system comprising:

at least one physical processor; and physical memory comprising computer-executable instructions that, when executed by the at least one physical processor, cause the at least one physical processor to perform acts comprising:

generating a training set comprising, from a long-form video, a video track clip, a primary language audio track corresponding to the video track clip, and a dubbed language audio track corresponding to the video track clip, wherein the dubbed language audio track preserves non-speech audio corresponding to the video track clip and replaces spoken language with translated spoken language;

applying, by one or more physical processors, a machine-learning model to the training set to generate:

a video representation of the video track clip, a primary-language audio representation of the primary language audio track, and a dubbed-language audio representation of the dubbed language audio track;

projecting, by one or more projection heads of the machine-learning model, the video representation, the primary-language audio representation, and the dubbed-language audio representation into a shared representational space;

computing, by the one or more physical processors, a contrastive cost between modalities, the contrastive cost comprising a first cost between the projected video representation and the projected primary-language audio representation, and a second cost between the projected video representation and the projected dubbed-language audio representation, wherein the contrastive cost comprises a sum of the first cost and the second cost; and iteratively updating parameters of the machine-learning model based on the contrastive cost over multiple training epochs to train the machine-learning model to position the projected video representation within a threshold distance of each of the projected primary-language audio representation and the projected dubbed-language audio representation within the shared representational space.

12. The system of claim 11, wherein the training set further comprises, from the long-form video, additional video track clips, primary language audio tracks corresponding to the additional video track clips, and dubbed language audio tracks corresponding to the additional video track clips.

13. The system of claim 12, further comprising computer-executable instructions that, when executed by the at least one physical processor, cause the at least one physical processor to perform an act comprising applying the machine-learning model to the training set to generate:

video representations of the additional video track clips paired with the primary language audio tracks corresponding to the additional video track clips, and video representations of the additional video track clips paired with the dubbed language audio tracks corresponding to the additional video track clips.

14. The system of claim 13, wherein applying the machine-learning model to the training set further comprises generating, for each of the additional video track clips, an additional video representation of the additional video track clip, an additional primary-language audio representation of the primary language audio track corresponding to the additional video track clip, and an additional dubbed-language audio representation of the dubbed language audio track corresponding to the additional video track clip, and projecting the additional video representation, the additional primary-language audio representation, and the additional dubbed-language audio representation into the shared representational space.

15. The system of claim 11, wherein the dubbed language audio track corresponding to the video track clip is in one of Spanish, French, or Japanese.

16. The system of claim 11, wherein the machine-learning model comprises convolutional neural network encoders and transformer models that are specialized for processing videos and audio spectrograms.

17. The system of claim 16, wherein the video representation and the primary-language audio representation comprise 1024-dimensional vectors output by the convolutional neural network encoders.

18. The system of claim 17, wherein the machine-learning model further comprises multi-layer perceptron heads that project the first video representation, the primary-language audio representation, and the dubbed-language audio representation into the shared representational space.

19. The system of claim 18, wherein the shared representational space comprises a 512-dimensional space.

20. A non-transitory computer-readable medium comprising one or more computer-executable instructions that, when executed by at least one processor of a computing device, cause the computing device to:

generate a training set comprising, from a long-form video, a video track clip, a primary language audio track corresponding to the video track clip, a first dubbed language audio track corresponding to the video track clip, and a second dubbed language audio track corresponding to the video track clip, wherein:

the first dubbed language audio track preserves non-speech audio corresponding to the video track clip and replaces spoken language with a first translated spoken language, and the second dubbed language audio track preserves non-speech audio corresponding to the video track clip and replaces spoken language with a second translated spoken language;

apply, by one or more physical processors, a machine-learning model to the training set to generate:

a video representation of the video track clip, a primary-language audio representation of the primary language audio track, a first dubbed-language audio representation of the first dubbed language audio track, and a second dubbed-language audio representation of the second dubbed language audio track;

project, by one or more projection heads of the machine-learning model, the video representation, the primary-language audio representation, the first dubbed-language audio representation, and the second dubbed-language audio representation into a shared representational space;

compute, by the one or more physical processors, a contrastive cost between modalities, the contrastive cost comprising a first cost between the projected video representation and the projected primary-language audio representation, a second cost between the projected video representation and the projected first dubbed-language audio representation, and a third cost between the projected video representation and the projected second dubbed-language audio representation, wherein the contrastive cost comprises a sum of the first cost, the second cost, and the third cost; and iteratively update parameters of the machine-learning model based on the contrastive cost over multiple training epochs to train the machine-learning model to position the projected video representation within a threshold distance of each of the projected primary-language audio representation, the projected first dubbed-language audio representation, and the projected second dubbed-language audio representation within the shared representational space.

* * * * *